Sept. 16, 1941.  C. R. SHUEY  2,255,863
TRAILER LOGGING BUNK
Filed Jan. 2, 1940  3 Sheets-Sheet 1
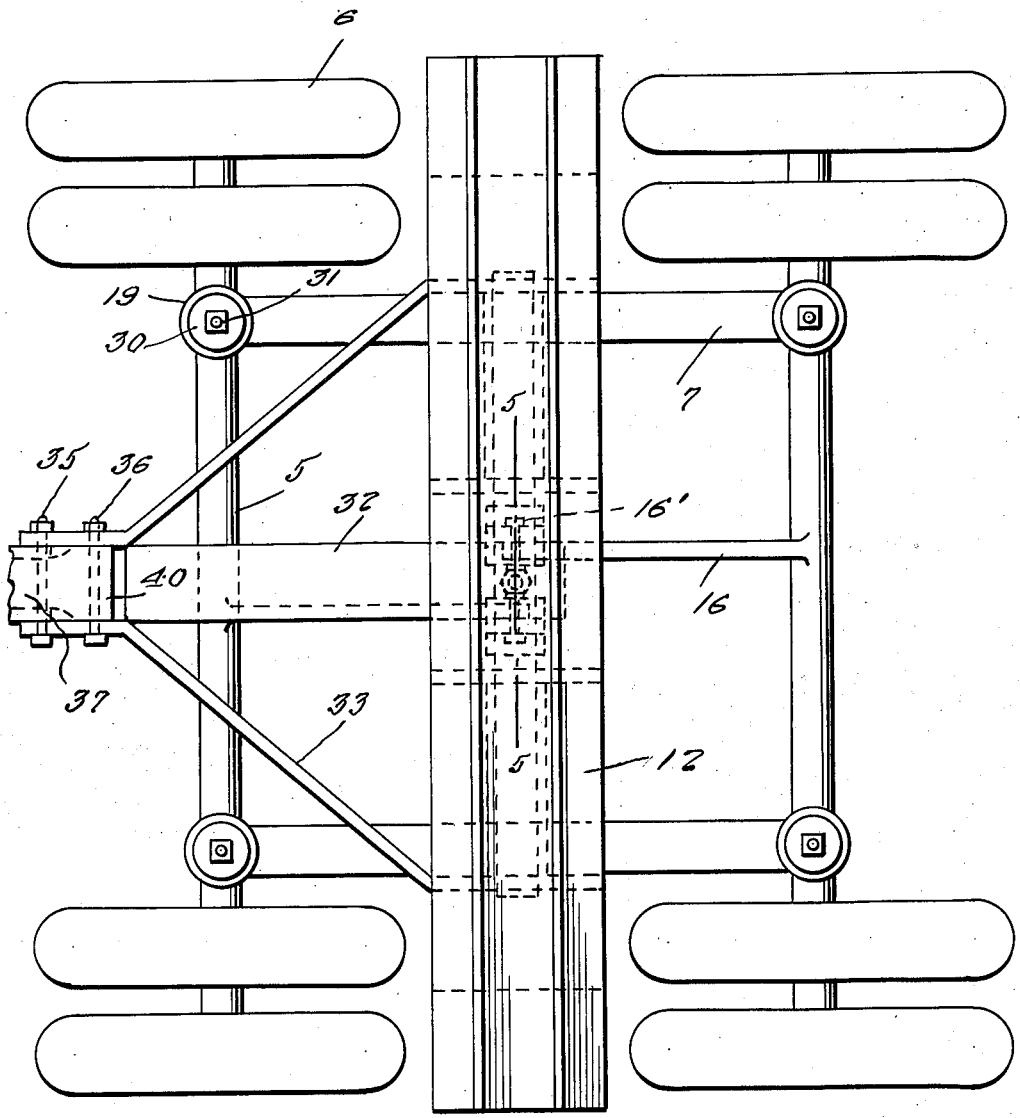
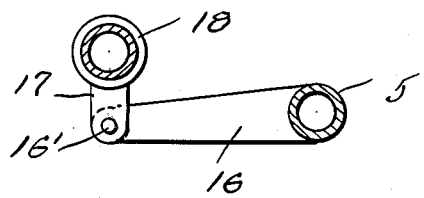
Inventor
C. R. Shuey
By Clarence A. O'Brien
and Hyman Berman
Attorneys Sept. 16, 1941.   C. R. SHUEY   2,255,863
TRAILER LOGGING BUNK
Filed Jan. 2, 1940   3 Sheets-Sheet 2
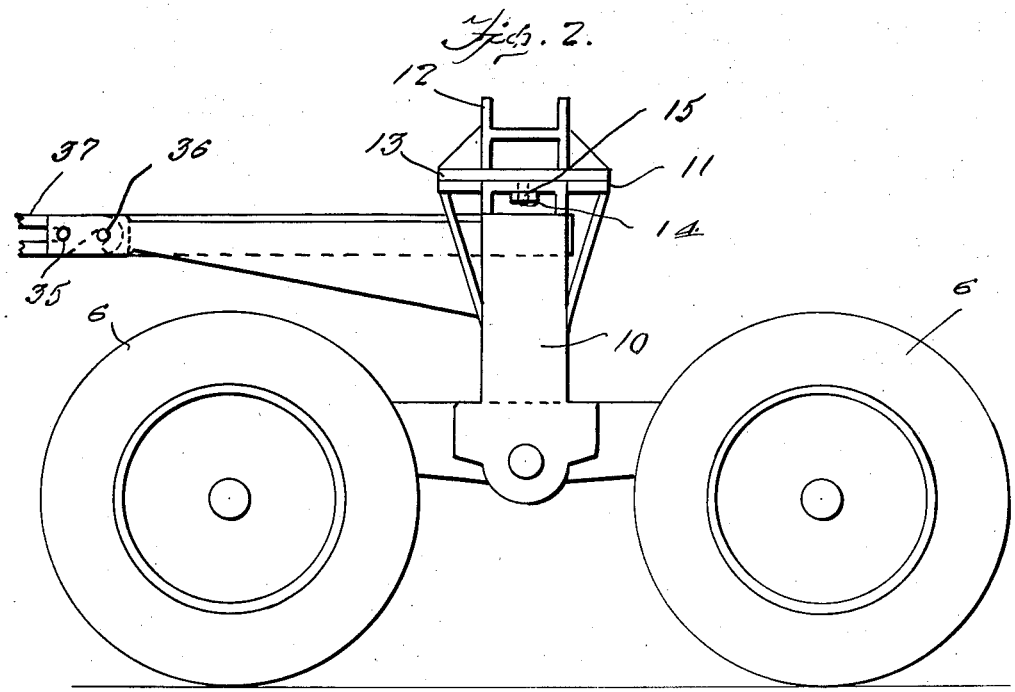
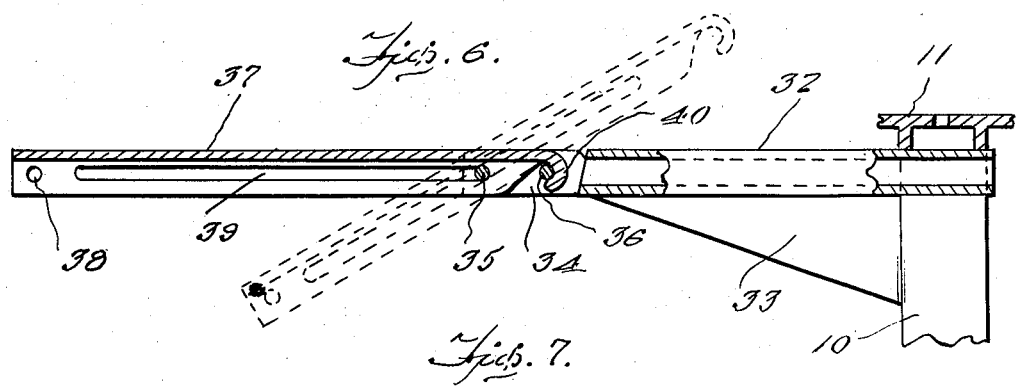
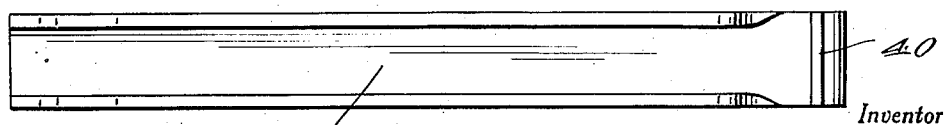
Inventor
C. R. Shuey
By Clarence A. O'Brien
and Hyman Berman
Attorneys Sept. 16, 1941.　　　C. R. SHUEY　　　2,255,863
TRAILER LOGGING BUNK
Filed Jan. 2, 1940　　　3 Sheets-Sheet 3
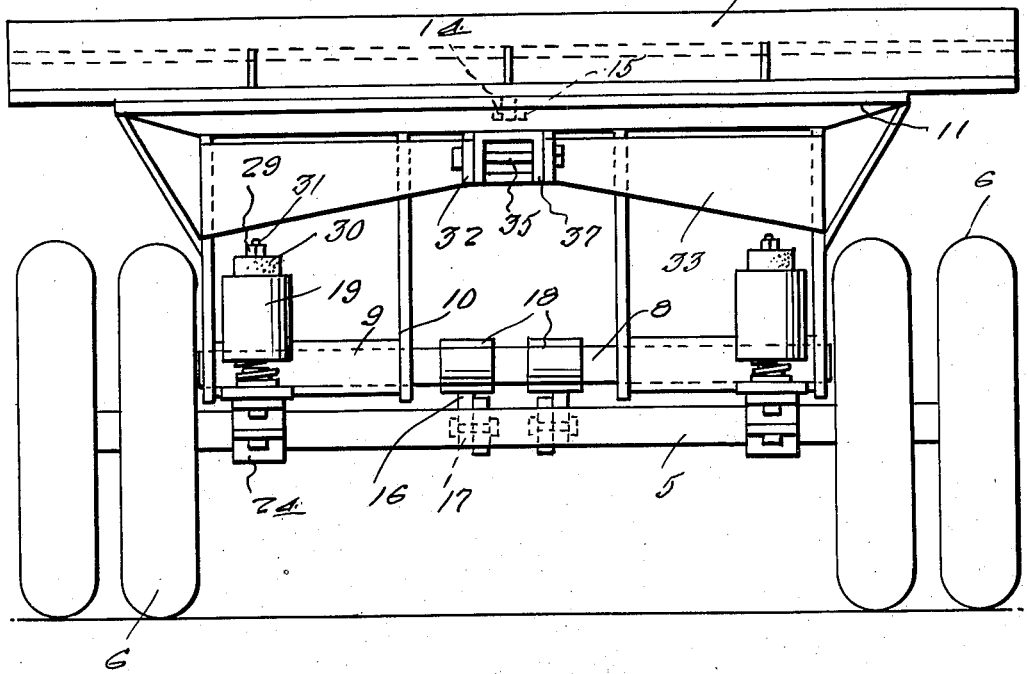
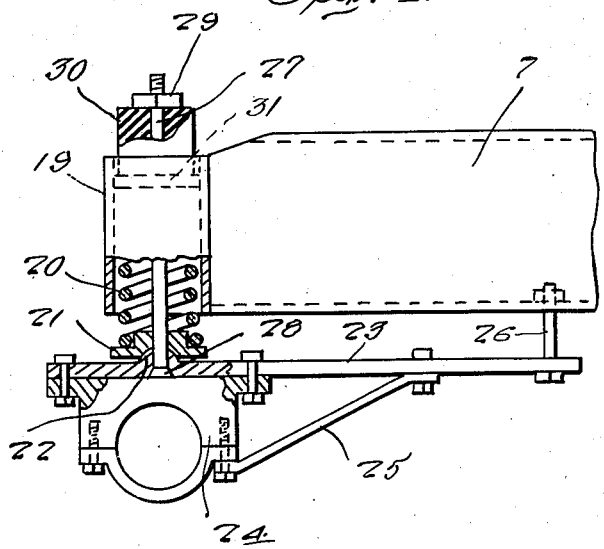
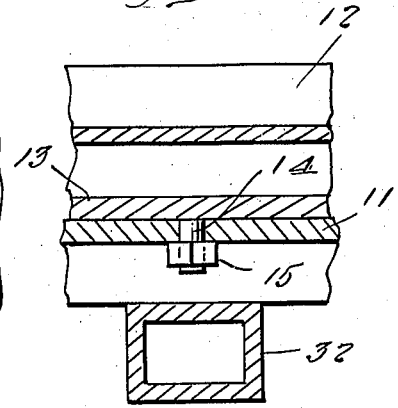
Inventor
C. R. Shuey
By Clarence A. O'Brien
and Hyman Berman
Attorneys Patented Sept. 16, 1941

2,255,863

UNITED STATES PATENT OFFICE 2,255,863

TRAILER LOGGING BUNK

Charles R. Shuey, La Grande, Oreg.

Application January 2, 1940, Serial No. 312,121

2 Claims. (Cl. 280—106.5)

The present invention relates to an improved remote-type trailer logging bunk embodying a dual axle, multiple wheel-supported trucks of a type including a bolster or equivalent support of the style utilized for carrying corresponding ends of poles, logs and the like for convenient transportation purposes.

Briefly, the preferred embodiment of the invention is characterized by a dual axle assembly wherein the axles are provided with twin or duplex wheels at their outer ends, there being associated with said axle assembly equalizing and load distributing means forming a substantially self-leveling and compensating structure for a simple I-beam bolster unit.

An important object of the present invention is to provide a pivoted bolster support for equalizing the load between the axles and providing a yieldable mounting for the frame on which the bolster support is carried.

A still further object is to provide a sliding sectional tongue connection for the bolster support adapted to facilitate the loading of the trailer on the rear of a truck for the convenient transportation of the trailer when not in use.

A still further object is to provide a device of this character of simple and practical construction, which is strong and durable, efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a top plan view.

Figure 2 is a side elevational view.

Figure 3 is a front elevational view.

Figure 4 is a detail of one of the spring mountings for the frame of the bolster support, and with parts broken away and shown in section.

Figure 5 is a fragmentary sectional view taken substantially on a line 5—5 of Figure 1.

Figure 6 is a longitudinal sectional view of the foldable tongue.

Figure 7 is a bottom plan view of one of the tongue sections, and

Figure 8 is a detail of one of the braces for the axles.

Referring now to the drawings in detail, the spaced parallel truck assembly axles, of which there are two, are denoted by the numerals 5, there being of duplicate construction and provided at their outer ends with twin road contacting rubber-tired wheels 6. This provides adequate cumulative wheel supporting and tracking surface for this relatively small truck and provides a support superior to single axle, two-wheel arrangements.

The axles 5 are connected adjacent their ends by a pair of longitudinally extending frame members 7.

An intermediate transversely extending rock shaft 8 has its ends journalled in a pair of sleeves 9 welded to the frame members 7 and a plurality of upstanding supporting members 10 have their lower ends welded to the shaft 8, the upper ends of said supporting members having secured thereon a transversely extending bolster platform 11.

A bolster 12 of substantially I-beam form is arranged with its edges resting on a base 13 from the underside of which a pin 14 projects through the platform 11 for rotatably supporting the bolster thereon. A nut 15 threaded on the pin 14 secures the bolster against accidental displacement.

The rocking movement of the shaft 8 is limited by a pair of arms 16 fixed at one end to the respective axles 5 and pivotally connected as at 16' to short arms 17 extending downwardly from collars 18 mounted on the shaft 8.

The collars 18 are fast on said shaft 8. At the junctures of the respective frame members 7 with the axles 5 I provide spring cushioning and shock absorbing means or a type shown to advantage in Figure 4 of the drawings. Each shock absorber comprises a cylinder 19 serving as a housing or casing for a coil spring 20, the spring bearing at its lower end against a thrust washer 21. The centralized bottom portion of the washer is formed with a concavity co-acting with a ball-like projection 22 formed on the upper surface of an anchoring bar 23. The projection 22 and concavity in the washer 21 form a self-leveling or ball and socket connection between the anchoring bar and the adjacent corner of the frame member 7. To the under side of the anchoring bar 23 is also secured the bearing 24 which is clamped on the axles 5. The plate 23 is also provided with a brace rod 25 and a loose pin connection 26 is provided between the end of the anchoring bar 23 and the frame member 7.

A bolt 27 extends upwardly through the projection 22, the bolt having a head 28 on its lower end countersunk in the bar 23, a nut 29 being threaded on the upper end of the bolt for clamping a rubber block or thrust member 30 in position within a socket 31 in the adjacent upper end of the cylinder 19. The foregoing construction provides a yieldable mounting between the ends of the frame members 7 and the axles 5. A stationary tongue section 32 is attached at its rear end to the under side of the platform 11 of the bolster support, the opposite sides of the section 32, adjacent its forward end having brace members 33 attached thereto, the rear ends of said brace members being secured to the outermost upright members 10 of the bolster support. The front end of the tongue section 32 is welded to the parallel front ends 34 of the braces 33, said ends 34 projecting forwardly and are provided with a pair of transversely extending pins 35 and 36 respectively, the pin 35 being in advance of the pin 36, as clearly shown in Figure 6 of the drawings. A tongue section 37 of channel form in cross section is provided with an opening 38 adjacent its front end for attaching to the truck, the sides of the section 37 having a longitudinal slotted opening 39 therein for slidably mounting said section on the pin 35. The rear end of the section 37 is provided with a downturned hook 40 for engaging the pin 36 when the sections are in longitudinally aligned horizontal position as shown by the full lines in Figure 6 of the drawings. The hook 40 may be released from the pin 36 and the section 37 moved into the position shown by the dotted lines in Figure 6 whereby the trailer bunk may be hoisted upon a trailer for transportation thereon.

It is believed the details of construction, operation and advantages of the device will be readily understood from the foregoing without further detailed explanation.

Having thus described the invention, what I claim is:

1. In a trailer logging bunk, a pair of spaced parallel axles having wheels mounted on the ends thereof, a pair of longitudinally extending side frame members overlying said axles and having spring housings at each end, upstanding coil springs in said housings for yieldingly supporting the frame members, axle anchoring bars having the axles journaled thereon and extending parallel with said members beneath the same, said bars having loose connections at one end thereof with said frame members, ball and socket connections between said bars and the lower ends of said springs and supporting the latter adjacent the other ends of the bars, pins extending upwardly from said connections axially through said springs, a transverse rock shaft intermediate said axles supported by said frame members, and a bolster mounted on said shaft.

2. In a trailer logging bunk, a pair of spaced parallel axles having wheels mounted on the ends thereof, a pair of longitudinally extending side frame members overlying said axles and having spring housings at each end, upstanding coil springs in said housings for yieldingly supporting the frame members, axle anchoring bars having the axles journaled thereon and extending parallel with said members beneath the same, said bars having loose connections at one end thereof with said frame members, ball and socket connections between said bars and the lower ends of said springs and supporting the latter adjacent the other ends of the bars, pins extending upwardly from said connections axially through said springs, a transverse rock shaft intermediate said axles supported by said frame members, a bolster mounted on said shaft, and means to limit rocking of said rock shaft comprising a pair of collars fast on the shaft and having depending crank arms, and a pair of links pivoted to said crank arms and axles, respectively.

CHARLES R. SHUEY.